United States Patent Office 3,360,083
Patented Dec. 26, 1967

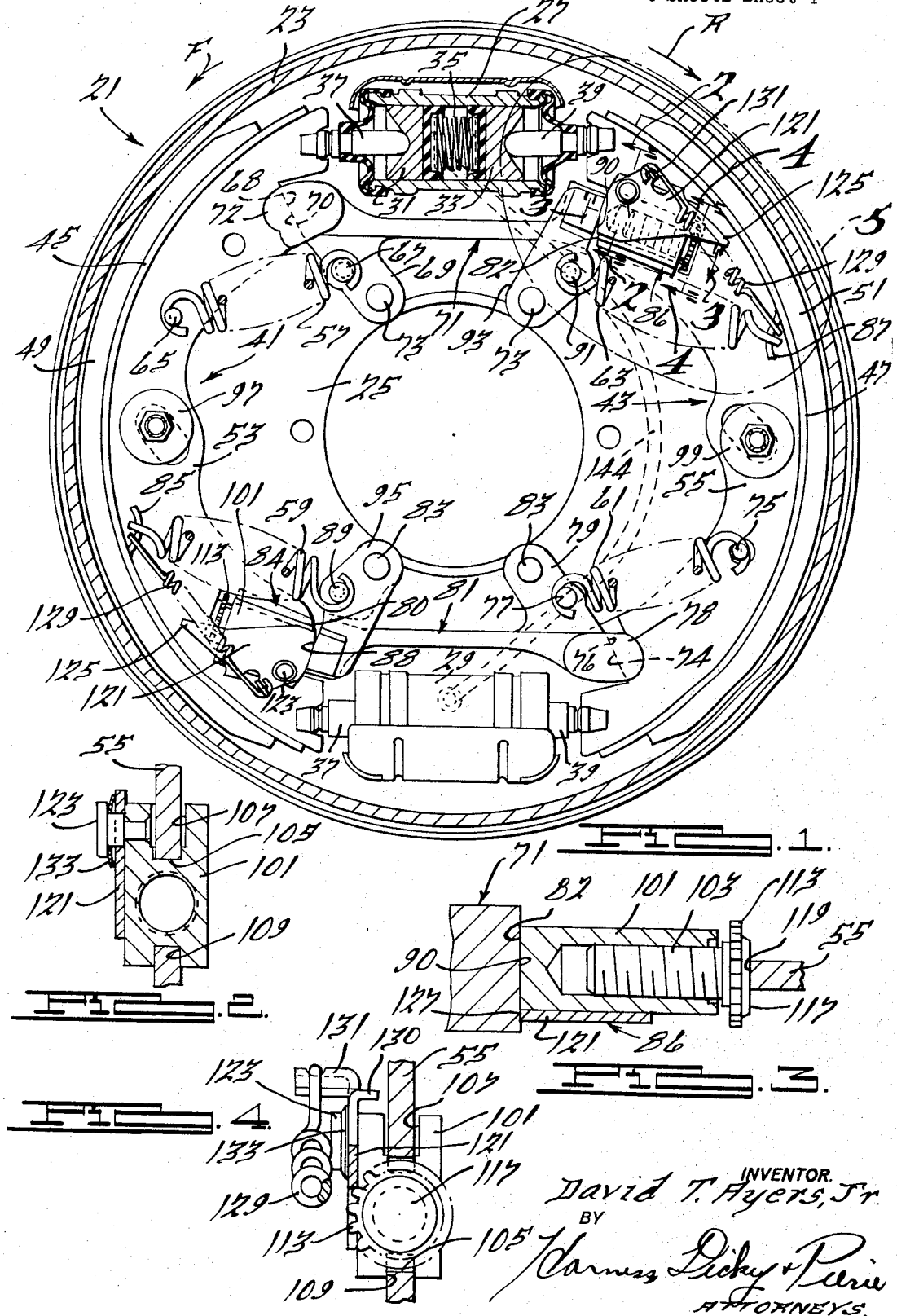

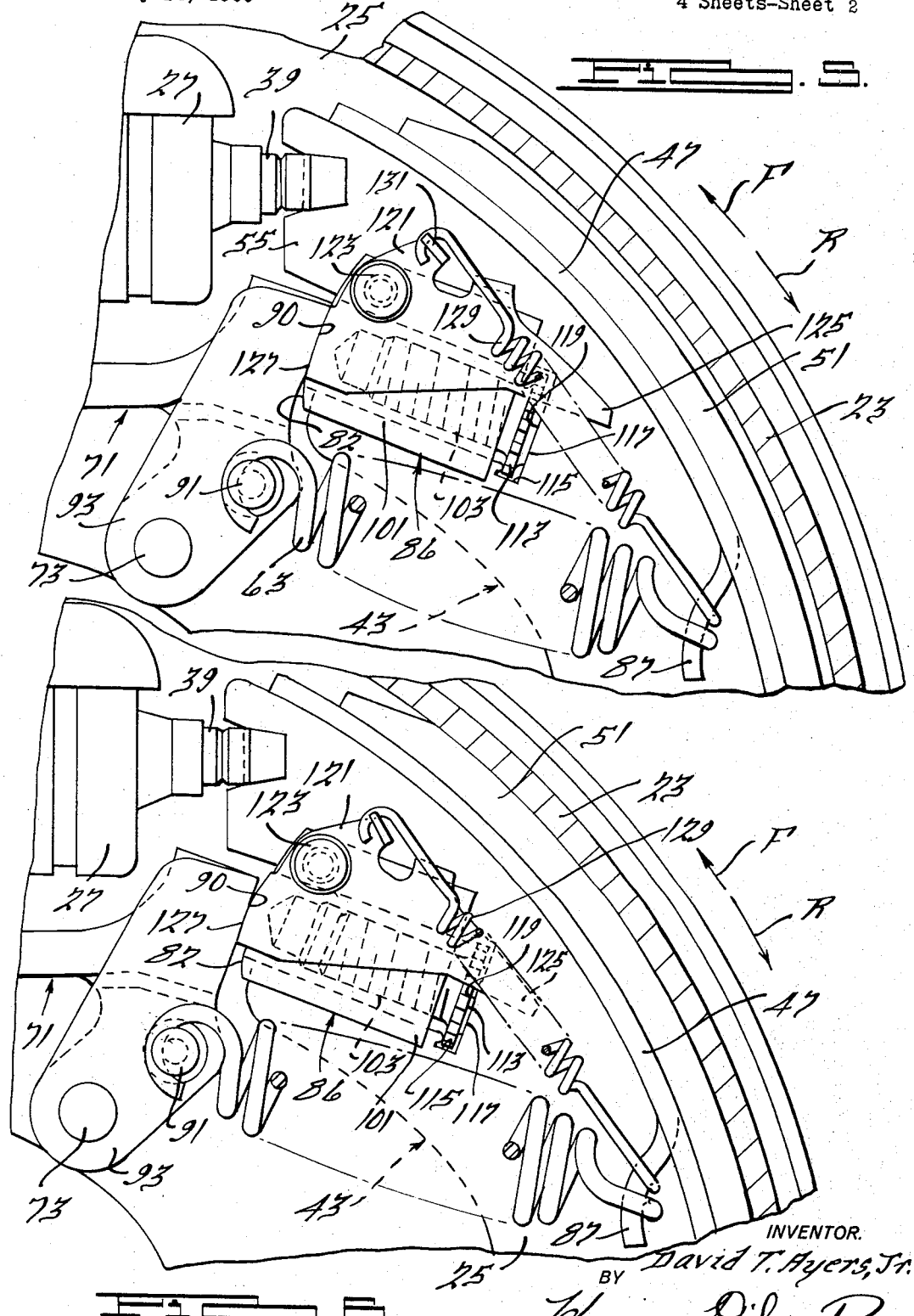

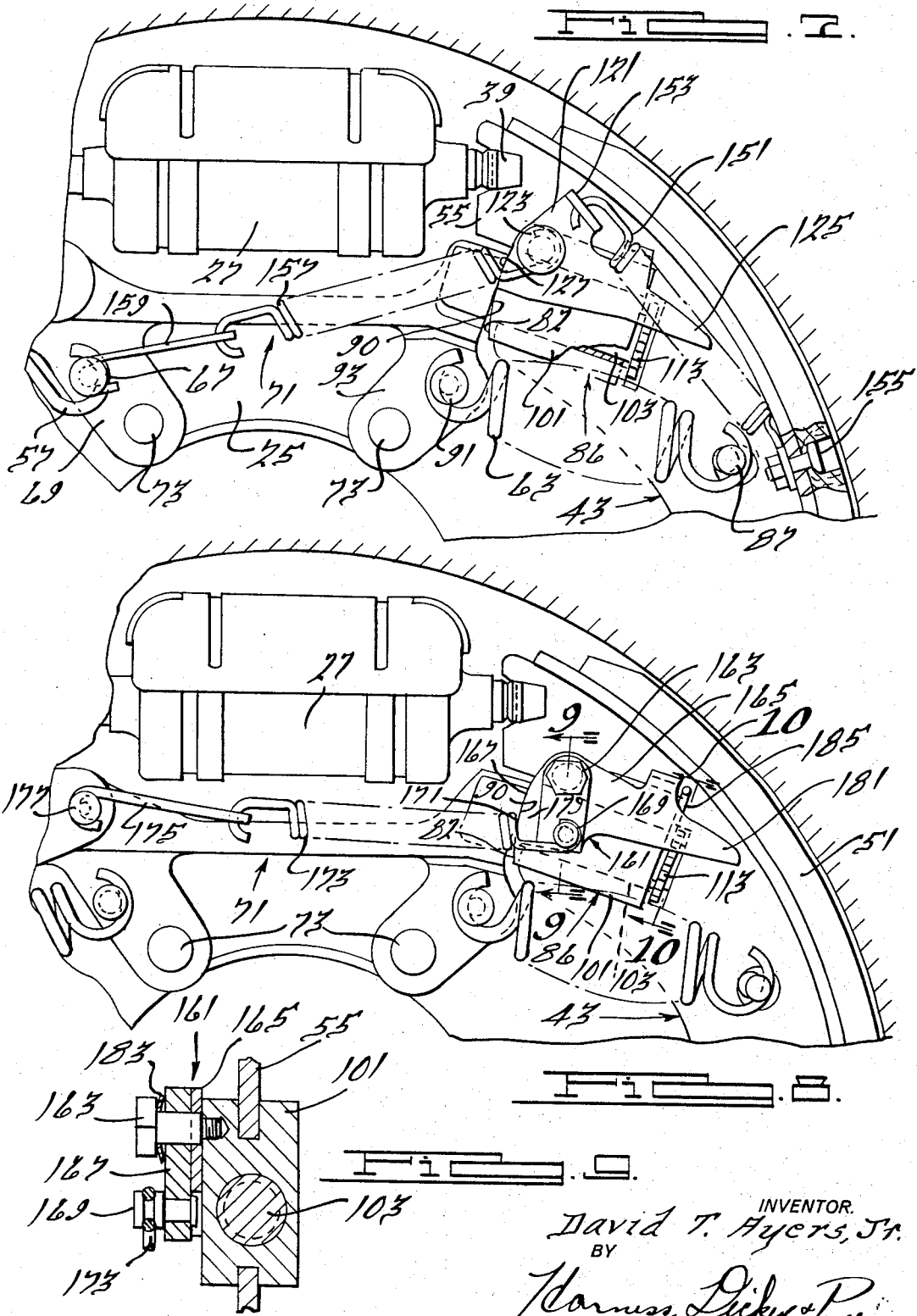

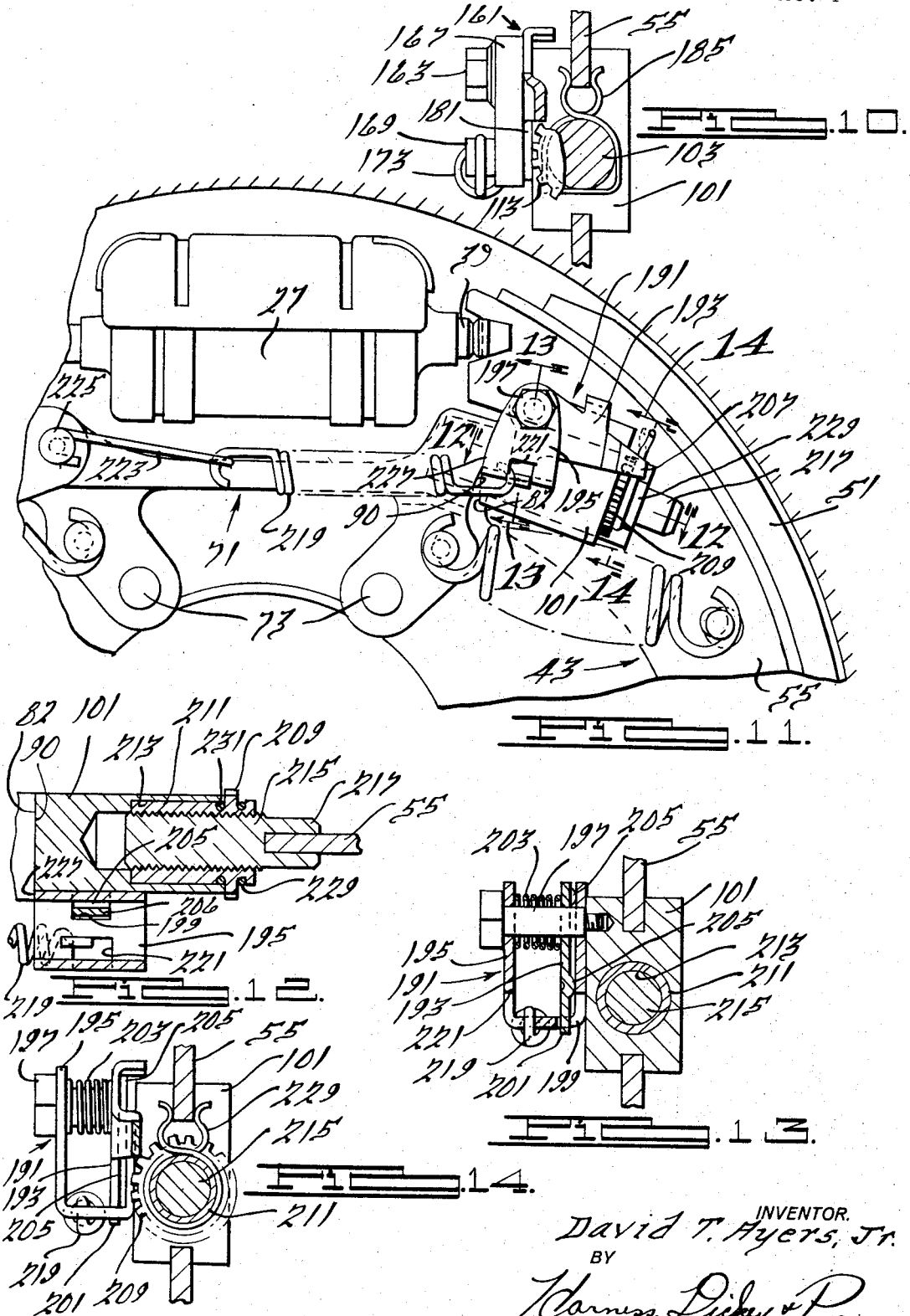

3,360,083
AUTOMATIC BRAKE ADJUSTER
David T. Ayers, Jr., Birmingham, Mich., assignor to Kelsey-Hayes Company, Romulus, Mich., a corporation of Delaware
Filed July 14, 1966, Ser. No. 565,292
18 Claims. (Cl. 188—79.5)

ABSTRACT OF THE DISCLOSURE

Several embodiments of automatic adjusting drum type brakes wherein the automatic adjusting device is carried by the web of the brake shoe. In each embodiment, the automatic adjusting device comprises a pair of threaded members, one of which is abuttingly engaged with the brake shoe and the other of which is adapted to abuttingly engage a fixed torque resisting member. Lever means are pivotally mounted upon one of the members and the lever means has a first portion that is adapted to abuttingly engage the fixed torque desisting means and another portion that is adapted to effect adjustment upon reverse brake application if sufficient lining wear has taken place.

---

This invention relates generally to vehicle brakes, and particularly to an improved automatic brake adjuster for drum-type brakes.

An important object of the present invention is to provide an improved simple and compact brake adjuster for floating or shifting anchor brake shoes of drum-type vehicle brakes operable to reposition the brake shoes relative to a brake drum to compensate for brake lining wear.

Another important object of the present invention is to provide an improved brake adjuster of the above character wherein all the parts are carried at one end of each brake shoe.

Further objects of the present invention include the provision of an automatic brake adjuster of the above character which is relatively inexpensive to manufacture, rugged in construction and reliable in use.

Other objects and advantages of the present invention will become more apparent from a consideration of the following detailed description taken in conjuction with the drawings in which:

FIGURE 1 is a sectional view of a brake embodying a preferred form of the invention and shown with the brake shoes in the released position;

FIG. 2 is an enlarged sectional view of FIG. 1 taken along the line 2—2 thereof;

FIG. 3 is an enlarged sectional view of FIG. 1 taken along the line 3—3 thereof;

FIG. 4 is an enlarged sectional view of FIG. 1 taken along the line 4—4 thereof;

FIG. 5 is an enlarged view of a portion of FIG. 1 taken within the enclosure 5;

FIG. 6 is a view similar to FIG. 5 showing the parts in position during actuation of the brake shoes while the vehicle moves in a reverse direction;

FIG. 7 is a view similar to FIG. 5 illustrating a modified form of the present invention;

FIG. 8 is a view similar to FIGS. 5 and 7 and illustrating still another modified form of the present invention;

FIG. 9 is an enlarged sectional view of FIG. 8 taken along the line 9—9 thereof;

FIG. 10 is an enlarged sectional view of FIG. 8 taken along the line 10—10 thereof;

FIG. 11 is a view similar to FIGS. 5, 7 and 8, and illustrating still another modified form of the present invention;

FIG. 12 is an enlarged sectional view of FIG. 11 taken along the line 12—12 thereof;

FIG. 13 is an enlarged sectional view of FIG. 11 taken along the line 13—13 thereof; and FIG. 14 is an enlarged sectional view of FIG. 11 taken along the line 14—14 thereof.

Broadly described, the present invention comprises a rotatable brake drum, a fixed torque resisting means, a brake shoe within said drum engageable with said torque resisting means and movable into engagement with said drum, variable length means carried by said brake shoe and including first and second longitudinally adjustable members engaging said torque resisting means and said brake shoe, lever means carried by one of said members and operatively engageable with the other of said members to adjust it longitudinally relative to said one member upon movement of said lever means a predetermined amount relative to said variable length means, said lever means being normally engaged with said torque resisting means and movable relative to said variable length means upon movement of said brake shoe in a direction away from said torque resisting means whereby to elongate said variable length means.

Referring now more specifically to the drawings, a vehicle brake embodying the present invention is illustrated generally at 21 in FIG. 1 and is seen to include a brake drum 23 operatively secured to a wheel (not shown) for rotation about a central axis. A stationary backing plate 25 is fixed to a nonrotatable part of the vehicle (not shown). A pair of wheel or brake cylinders 27, 29 are fixed to the backing plate 25 and each of the cylinders is provided with a pair of pistons 31, 33 urged apart by a light compression spring 35. The pistons 31, 33 operate plungers 37, 39 extending from opposite ends of the cylinders 27, 29.

A pair of arcuately shaped brake shoes 41, 43 are provided with rim portions 45, 47 upon which are fixed arcuate brake linings 49, 51, respectively. The rim portions 45, 47 are reinforced and supported against flexure by web portions 53, 55 extending generally perpendicular thereto. The outer ends of the plungers 37, 39 are bifurcated and engage the web portions 53, 55, as seen in FIG. 1, so that when hydraulic fluid is delivered to the cylinders 27, 29, such as from a conventional pedal operated master cylinder, the pistons 31, 33 are moved apart and press the brake linings 49, 51 into frictional engagement with the brake drum 23. The brake linings 49, 51 are returned and are normally held spaced from the brake drum 23 and against fixed torque resisting or anchor means to be described by tension return springs 57, 59 and 61, 63, respectively.

As seen in FIG. 1, the return spring 57 has one end hooked to a pin 65 on the brake shoe web 53 and its other end hooked to a pin 67 on an arm 69 of a torque resisting member 71, which, in turn, is fixed to the backing plate 25 by bolts 73 or the like. The spring 57 normally holds an abutment surface 68 on the brake shoe web 53 seated against an anchor surface 70 formed at the base of a slotted end 72 of the member 71. Similarly, the return spring 61 has one end hooked to a pin 77 on an arm 79 of another torque resisting member 81, also fixed to the backing plate 25 by bolts 83. This spring 61 normally holds an abutment surface 74 on the brane shoe web 55 seated against an anchor surface 76 at the base of a slotted end 78 of the torque resisting member 81. The springs 59, 63 have one end hooked to projections 85, 87 on the brake shoe rim portions 45, 57 and their other end hooked to pins 89, 91 on arms 93, 95 provided on the torque resisting members 71, 81, respectively. The springs 59, 63 normally hold abutment surfaces 80, 82 of anchor members 84, 86 carried by the brake shoe webs 53, 55 seated against anchor surfaces 88, 90 on the torque resisting members 81, 71, respectively. Conventional hold-down devices 97, 99 hold the brake shoes 41, 43 in proper lateral relation to the backing plate 25; however, the brake shoes 41, 43 are of the shifting or floating anchor type in that they have no fixed attachment to the backing plate 75 or torque resisting member 71, 81.

It will be appreciated that the radial travel of the brake shoes 41, 43 needed to bring the brake linings 49, 51 into contact with the brake drum 23 increases as the brake linings become worn since movement of the brake shoes 41, 43 originates from the fixed anchor surfaces 70, 84 and 76, 86, respectively. Thus, in order to maintain brake shoe and brake pedal travel relatively constant, it is necessary to adjust the brake shoes 41, 43 radially outwardly as the linings 49, 51 wear.

To this end, each of the anchor members 84, 86 is adjustable so that its length can be varied and the radial position of the brake shoes 41, 43 adjusted relative to the brake drum 23, accordingly. The anchor members 84, 86, the adjusting mechanism therefor and mode of operation thereof are identical so that a detailed explanation of the anchor member 86 will suffice here. It is to be understood that like numerals in the drawings refer to like parts for both anchor members 84, 86 as well as the adjusting mechanism therefor.

Turning now to FIGS. 2–6, the anchor member 86 is seen to include an anchor block 101 having an adjusting screw or threaded shank 103 threadedly received therein. The anchor block 101 is slotted along its top and bottom at 107, 109 to slidably support the block 101 in a slot 105 formed in the brake shoe web 55. As shown best in FIGS. 3, 5 and 6, the outer end of the anchor block 101 defines the abutment surface 82. The outer end of the threaded shank 103 is formed with a toothed wheel 113 which is rotatably retained in an enlarged slot 115 in the brake shoe web 55 adjacent the slot 105. The outer end 117 of the wheel 113 engages a surface 119 defining the end of the slot 115 in the brake shoe web 55. Thus, by turning the threaded shank 103 to move it out of the anchor block 101 or toward the right, as seen in FIGS. 3, 5 and 6, the anchor member 86 is elongated and the released or off position of the brake shoe 43 is adjusted closer to the brake drum 23. This, in turn, effects a take-up of wear in the brake lining 51 so that by controllably turning the shank 103, the required brake pedal travel to actuate the brakes can be kept substantially constant. As is conventional, the shank 103 can be turned manually as by inserting a tool through an opening (not shown) in the backing plate 25 and turning the toothed wheel 113. However, according to the present invention, provision is made for automatic adjustment of the anchor member 86 as the brake lining wears.

To this end, there is provided a lever 121 which is pivotally mounted on the block 101 by a pin or rivet 123. A projecting finger 125 on the lever 121, spaced from the pivot pin 123, is adapted to interferingly engage the toothed wheel 113 while an end edge 127 of the lever 121 near the pivot pin 123 engages the anchor surface 90. A tension spring 129 has one end hooked to the projection 87 on the brake shoe rim 47 and its other end hooked to a laterally projecting flange 131 on the lever 121 to normally bias the lever 121 in a clockwise direction about the pivot 123 as seen in FIGS. 1, 5 and 6. A lateral projection 130 on the lever 121 is positioned to engage the top of the anchor block 101 to limit pivotal movement of the lever 121 and position the parts during assembly and disassembly. The strength of the spring 129 is less than that of the return spring 63 so that the force exerted by the lever edge 127 on the anchor surface 90 is not enough to unseat the abutment surface 82 of the anchor block 101 from the anchor surface 90 when the brakes are deenergized.

In use, when the brakes are energized, the brake shoe 43 moves radially outwardly until the lining 51 engages the drum 23. This causes the brake shoe web 55 and the anchor member 86 also to move radially outwardly away from the anchor surface 90 so that the lever 121 can swing about the pivot 123 under the action of the spring 129. The end 127 of the lever 121 remains in contact with the anchor surface 90 so that the extent of pivotal movement of the lever 121 allowed by this brake shoe radial movement depends upon the degree to which the brake lining 51 is worn.

In addition to this radial movement, it will be appreciated that frictional forces between the brake lining 51 and the brake drum 23 during brake actuation tend to move the brake shoe 43 in the direction the drum 23 is turning. When the vehicle (not shown) moves forwardly, the drum 23 turns in the direction illustrated by the arrow F, seen in FIGS. 1, 5 and 6, this frictional force moves the brake shoe 43 also in the direction of the arrow F. This moves the abutment surface 82 of the anchor block 101 against the anchor surface 90 and prevents substantial pivotal movement of the lever 121 relative to the anchor block 101 so that no turning movement of the toothed wheel 113 and shank 103 occurs at this time.

However, when the vehicle moves in a reverse direction, the brake drum 23 rotates in the direction of the arrow R causing the brake shoe 43 also to move in this direction in addition to the normal radial travel. During this time, the abutment surface 74 on the other end of the brake shoe web 55 seats against the anchor surface 76 while the abutment surface 82 on the anchor block 101 moves away from the anchor surface 90 as seen in FIG. 6. Depending upon the extent to which the brake lining 51 has worn, the brake shoe 43 moves increasingly further in a radial direction and by reason of the arcuate configuration of the abutment surface 74, the brake shoe 43 also moves increasingly further in the direction of the arrow R. This, in turn, permits increasingly greater pivotal movement of the lever 121 until at some preselected point of brake lining wear, the finger 125 of the lever 121 turns the toothed wheel 113 and the threaded shank 103 a distance of one tooth on the wheel 113. This, in turn, elongates the anchor member 86 and adjusts the brake shoe 43 radially outwardly. A Belleville washer 133 between the lever 121 and the pivot pin 123 permits some lateral movement of the lever 121 to accommodate arcuate configuration of the wheel 113. When the brakes are thereafter released, the abutment surface 82 on the anchor block 101 again seats against the anchor surface 90 on the torque resisting member. The end edge 127 of the lever 121 also engages the anchor surface 90 so that the lever 121 is repositioned as shown in FIG. 5. During this lever repositioning, the finger 125 ratchets over the tooth on the wheel 113 behind it.

It will be appreciated that radial adjustment of each brake shoe 41, 43 initially takes place only at the end of the brake shoe which carries the anchor member 84, 86; however, because of the floating disposition of the brake shoes 41, 43, the adjustment is distributed equally over each of the shoes immediately upon the next brake application. This is so since the wheel cylinders 27, 29 are interconnected by a fluid conduit 144 so that the wheel cylinders are at equal pressure during brake application. Thus, equal pressures acting on the plungers 37, 39 apply equal forces to both ends of the shoes 41, 43 and the floating nature of the brake shoes and the plungers 37, 39 which actuate them act to automatically reposition the shoes immediately upon brake application. Thereafter, upon brake release, the return springs acting equally on both ends of the shoes 41, 43 position them at uniform radial distances from the drum 23.

From the foregoing, it will be seen that when the brake linings 49, 51, or either one of them, have worn to a predetermined extent, the anchor members 84, 86, or either one of them, will be elongated accordingly through pivotal movement of the levers 121 during energization of the brakes when the vehicle (not shown) is moving in a reverse direction and the brake drum 23 is turning in the direction of the arrow R. This adjustment has no effect on the action of the brakes at this particular time but does take up slack caused by wear of the linings 49, 51 so that the brake pedal travel needed on the next brake application is adjusted. All the adjustment components are carried at one end, which is the trailing or anchor end of each of the brake shoes 41, 43 which is where the available adjusting forces during reverse vehicle and brake drum movement result and this makes possible a very simple, inexpensive and compact and yet very effective adjusting assembly.

A modified form of the present invention is illustrated in FIG. 7. In this form, certain of the parts are identical or substantially identical to parts illustrated and described above for the embodiment of FIGS. 1–6 so that like numerals in FIGS. 1–6 and FIG. 7 refer to like parts.

In FIG. 7, a somewhat heavier or stronger lever spring 151 is employed which is hooked at one end to a lateral projection 153 on the lever 121 and at its other end to a bolt 155 serving to hold the brake lining 51 in place on the brake shoe rim 47. The stronger force imposed by this spring 151 on the lever 121 serves more effectively to insure turning movement of the toothed wheel 113 and the threaded shank 103 relative to the anchor block 101 when the lever finger 125 moves relative to the toothed wheel 113 as described above in the embodiment of FIGS. 1–6.

The force imposed by the spring 151 on the lever 121 causes the lever 121 to tend to turn in a clockwise direction about the pivot 123 as seen in FIG. 7 and biases the end edge 127 of the lever 121 against the anchor surface 90. Any tendency of the anchor block 101 to unseat from the anchor surface 90 under the force of the heavier spring 151 is resisted by the force of the return spring 63 and by another tension spring 157 hooked at one end to the lever pivot 123. The other end of the spring 157 is hooked to one end of a C-shaped link 159, the other end of which is hooked to the pin 67. By using the spring 157 together with the return spring 63 to overcome the tendency for the spring 151 to unseat the anchor block abutment surface 82 from the anchor surface, a relatively strong spring 151 can be utilized. This, in turn, insures proper adjustment of the anchor member 86 and permits the use of standard return springs 63. Furthermore, the link 159 can be varied in length to adjust the opposing force imparted by the spring 157. In all other respects, the construction and operation of the embodiment of FIG. 7 is the same as that of FIGS. 1–6 so that a detailed description is omitted here.

Another embodiment of the present invention is illustrated in FIGS. 8–10, and, again, like numerals in FIGS. 1–6, FIG. 7 and FIGS. 8–10 refer to like parts. In the form of the invention illustrated in FIGS. 8–10, a modified lever means, illustrated generally at 161 is pivotally mounted by a screw 163 upon the anchor block 101. The lever means 161 includes first and second lever portions 165, 167 which are interconnected for conjoint pivotal movement about the screw 163 by a pin 169.

One end edge 171 of the lever portion 167 is positioned to engage the anchor surface 90 on the torque resisting member 71 and these two surfaces are normally held in engagement by a tension spring 173 having one end hooked to the pin 169. The other end of the spring 173 is hooked to one end of a link 175, the other end of which is hooked to a pin 177 fixed to the torque resisting member 71. If desired, the lever portion 167 may be tapered at 179 to avoid interference with the coils of the spring 173.

The lever portion 165 preferably is of somewhat lighter gauge construction than the lever portion 167 and has a projecting finger 181 at one end spaced from the pivot screw 163 positioned to interferingly engage the toothed wheel 113. Thus, as described in the sequence of operation for the embodiment of FIGS. 1–6, the anchor block 101 is moved in a direction away from the anchor surface 90 on the torque resisting member 71 when the brakes are energized during rearward vehicle movement. When the brake lining 51 has become worn sufficiently, the movement of the anchor block 101 is such that the spring 173 by pivoting the lever portion 167 and through the pin 169 the lever portion 165 causes the toothed wheel 113 to rotate and the anchor member 86 to elongate. A Belleville washer 183 between the head of the screw 163 and the lever portion 167 permits some lateral displacement of the lever portions 165, 167 and the portion 165 is to some extent flexible to accommodate the arcuate configuration of the wheel 113 during movement of the portion 165 relative to the toothed wheel 113. In addition, a clip spring 185 is looped around the shank 103 adjacent the toothed wheel 113 and has its ends in gripping relation with the brake shoe web 55, as seen in FIG. 10 to prevent back-up turning movement of the shank 103 during return movement of the lever portion 165.

It will be appreciated that the lever arm length from the pivot screw 163 to the area of the finger 181 of lever portion 165 which engages the toothed wheel 113 is somewhat greater than the lever arm length from the screw 163 to the area of the lever portion 167 which engages the anchor surface 90. The force moment applied to the toothed wheel 113 by the lever finger 181 is correspondingly greater than the moment applied to the anchor surface 90 so that the toothed wheel 113 and the threaded shank 103 are effectively turned. Furthermore, the disposition of the spring 173 biases the lever portion 167 against the anchor surface 90 without any tendency to unseat the anchor block abutment surface 82 therefrom. Thus, a relatively strong spring 173 can be used here to insure timely adjustment of the anchor member 86.

Still another embodiment of the present invention is illustrated in FIGS. 11–14. Like the embodiment of FIGS. 8–10, the form of FIGS. 11–14 employs a two-part lever, illustrated in FIGS. 11–14. Like the embodiment of FIGS. second lever portions 193, 195 pivotally mounted on the anchor block 101 by a screw 197. The lever portion 195 is generally U-shaped in cross-section, as seen best in FIG. 13, and is provided with a slot 199 which receives a bottom projection 201 on the lever portion 193 so that the lever portions 193, 195 turn conjointly about the pivot screw 197. A compression spring 203 surrounds the screw 197 and normally biases the lever portion 193 toward one leg of the lever portion 195. If desired, the lever portion may have lateral projections 205 positioned to engage the lever portion 195 to reduce the surface area contact between these lever portions 193, 195.

The lever portion 193 has an outer end 207 positioned to interferingly engage a toothed wheel 209 formed on an internally threaded sleeve 211. The anchor block 101 has a bore 213 rotatably receiving the sleeve 211 and a shank 215 is threadedly received within the sleeve 211. Outer bifurcated end 217 of the shank 215 is fitted over the brake shoe web 55 so that the shank 215 is prevented from rotating.

In use, pivotal movement of the lever portion 193 in a clockwise direction about the screw 197, as seen in FIG. 11, causes the lever outer end 207 to engage the toothed wheel 209 and threads the sleeve 211 relative to the shank 215. This, in turn, moves the anchor block 101 toward the left, as seen in FIGS. 11 and 12, to adjust the brake shoe 43 radially outwardly and takes up slack resulting from wear of the brake lining 51.

To effect this pivotal movement of the lever portion 193, a tension spring 219 has one end hooked in a slot 221 formed in the lever portion 195 and its other end is hooked to one end of a link 223, the other end of which is hooked over a pin 225 fixed to the torque resisting member 71. One edge 227 of the lever portion 195 is normally held in engagement with the anchor surface 90 of the torque resisting member 71. Thus, when the brake lining 51 has worn sufficiently, energization of the brakes during rearward vehicle movement causes the anchor block 101 to move away from the anchor surface 90 and the brake shoe 43 radially outwardly.

As was the case in the embodiment of FIGS. 8–10, a clip spring 229 may be looped around the sleeve 211 to resist back-up movement thereof during return of the lever portion 193 after adjustment. An antifriction ring 231 may be provided between the bore 213 and the sleeve 211.

One of the advantages of the sleeve 211 and shank 215 construction illustrated here is that the adjusting force imposed by the end 207 of the lever portion 193 on the toothed wheel 209 remains constant through full adjustment of the sleeve 211 and shank 215. This is so since brake adjustment is effected by relative longitudinal movement between the anchor block 101 and the shank 215, and the sleeve 211 is not adjusted longitudinally relative to the anchor block 101. Thus, adjustment of the brake shoe 43 is afforded with equal ease throughout full wear of the brake lining 51.

Another advantage of this embodiment is that like the embodiment of FIGS. 8–10, a relatively high moment arm force acting on the toothed wheel 209 is realized without any tendency to unseat the anchor block abutment surface 82 from the anchor surface 90 as a result of the force of spring 219 through the relative lengths of the lever portions 193, 195 and the disposition of the spring 219 relative to the area of contact between the lever portion 195 and the anchor surface 90. This, in turn, insures timely adjustment of the brake shoe 43.

By the foregoing, there has been disclosed an improved automatic brake adjusting construction, and while preferred embodiments of the present invention have been illustrated and described above in detail, various additions, substitutions, modifications and omission may be made thereto without departing from the spirit of the invention as encompassed by the appended claims.

What is claimed is:

1. A self adjusting drum type brake for coaction with a rotatable brake drum, said brake comprising a fixed torque resisting means, a brake shoe carrying a lining and supported within the drum for movement of said lining into engagement with the drum, and an automatic adjusting device carried by said brake shoe and juxtaposed to said fixed torque resisting means, said automatic adjusting device comprising a first member abuttingly engaged with said brake shoe, a second member adapted to abuttingly engage said fixed torque resisting means for precluding rotation of said brake shoe in at least one direction, said first and said second members being extensible for compensating for wear of the lining of said brake shoe, and automatic adjusting means carried by one of said members, said automatic adjusting means having a first portion adapted to engage said torque resisting means and a second portion for incrementally extending said first and said second members relative to each other in response to a predetermined movement of said one of said members relative to said fixed torque resisting means.

2. A device as defined in claim 1 wherein said automatic adjusting means comprises lever means pivotally mounted on said one member.

3. A device as defined in claim 2 which further includes spring means normally biasing said first portion of said lever means into engagement with said torque resisting means.

4. A device as defined in claim 2 wherein said first member comprises a block slidable on said brake shoe, said second member comprising a threaded member having an operative threaded connection to said block, said threaded member extending outwardly of said block and being longitudinally adjustable relative to said block upon turning of said operative threaded connection, said second portion of said lever means being effective to turn said operative threaded connection.

5. A device as defined in claim 4 wherein the operative threaded connection between said threaded member and said block is a direct connection wherein said block is formed with a threaded opening in which said threaded member is received.

6. A device as defined in claim 4 wherein the operative threaded connection between said threaded member and said block comprises a bore formed in said block, an internally threaded sleeve member rotatably supported in said bore, said threaded member being engaged with the internal threads of said sleeve, said second portion of said lever being engaged with said sleeve for rotating said sleeve.

7. A device as defined in claim 6 further including frictional means engaging said sleeve for resisting rotation of said sleeve.

8. A device as defined in claim 4 further including spring means for biasing said first portion of said lever into engagement with said torque resisting means.

9. A device as defined in claim 8 wherein said spring means engages said lever and said brake shoe.

10. A device as defined in claim 9 which includes another spring means normally biasing said block toward said torque resisting means.

11. A device as defined in claim 16 further including spring means for biasing said first portion of said lever and said block into engagement with said torque resisting member.

12. A device as defined in claim 11 wherein said threaded member has a wheel engageable by said second portion of said lever means, said spring means is attached to said lever means at a point spaced a first predetermined distance from said pivotal connection between said lever means and said block, and said second portion of said lever means engaging said wheel at a point spaced a second predetermined distance from said pivotal connection greater than said first predetermined distance.

13. A device as defined in claim 2 further including means for normally biasing said first portion of said lever means into engagement with said torque resisting means, said lever means being in a first position when said brake shoe is retracted and being movable to a second position under the influence of said biasing means when said first member moves away from said fixed torque resisting means more than a predetermined amount for effecting the incremental adjustment of said automatic adjusting device.

14. An automatic adjusting device for a drum type brake and adapted to be carried by a brake shoe of such a brake, said automatic adjusting device comprising a block having one end adapted to abuttingly engage a fixed torque resisting means of the brake, a bore formed in the other end of said block, a male threaded member received in said bore, abutment means on said male threaded member adapted to abuttingly engage the brake shoe, means providing an operative threaded connection between said male threaded member and said block for elongating said automatic adjusting means upon relative rotation of said operative threaded connection, said operative threaded connection including a star wheel juxtaposed to said other end of said block, lever means having a first portion adapted to engage the torque resisting means and a second portion adapted to engage and rotate said star wheel, and means for pivotally supporting said lever means upon said block.

15. A device as defined in claim 14 wherein the operative threaded connection comprises female threads formed in the bore in said block.

16. A device as defined in claim 14 wherein the operative threaded connection comprises an internally threaded sleeve rotatably supported in said bore, said star wheel being affixed to said sleeve, said male threaded member being threadingly engaged with said internal threads of said sleeve.

17. A device as defined in claim 14 wherein the means for pivotally supporting said lever upon said block includes means for permitting axial movement of said lever relative to its pivot axis.

18. A device as defined in claim 14 wherein said lever means comprises a first lever on which said first portion is formed, a second lever on which said second portion is formed and means for connecting said levers for simultaneous pivotal movement.

References Cited

UNITED STATES PATENTS

| 2,292,017 | 8/1942 | Smith | 188—79.5 |
| 3,169,610 | 2/1965 | Gold | 188—79.5 |

DUANE A. REGER, *Primary Examiner.*

UNITED STATES PATENT OFFICE
CERTIFICATE OF CORRECTION

Patent No. 3,360,083                      December 26, 1967

David T. Ayers, Jr.

It is hereby certified that error appears in the above numbered patent requiring correction and that the said Letters Patent should read as corrected below.

Column 1, line 20, for "desisting" read -- resisting --; column 6, line 40, for "illustrated in FIGS. 11-14. Like the embodiment of FIGS." read -- illustrated generally at 191, and which includes first and --.

Signed and sealed this 11th day of March 1969.

(SEAL)
Attest:

Edward M. Fletcher, Jr.                        EDWARD J. BRENNER

Attesting Officer                              Commissioner of Patents